3,023,219
PRODUCTION OF CARBAZOLE
Matthias Seefelder and Herbert Maisack, Ludwigshafen (Rhine), Gartenstadt, Germany, assignors to Badische Anilin- & Soda-Fabrik Aktiengesellschaft, Ludwigshafen (Rhine), Germany
No Drawing. Filed Sept. 30, 1959, Ser. No. 843,340
Claims priority, application Germany Oct. 2, 1958
10 Claims. (Cl. 260—315)

This invention relates to an improved process for the production of carbazole.

Carbazole is an important intermediate product for plastics because the polymers of N-vinylcarbazole have excellent properties. The quality of these polymers is dependent to a high degree on the purity of the initial materials. Commercial carbazole, obtained from mineral coal tar, however, is contaminated by impurities which can only be removed with difficulty in a laborious way.

It is already known that octahydrocarbazole is obtained from cyclohexanone azine when a solution of the azine in tetrahydronaphthalene is introduced into tetrahydronaphthalene heated to 180° C. into which dry hydrogen chloride is led at the same time. After the troublesome working up of the mixture, there is however obtained only about 30% of the theoretical yield of octahydrocarbazole.

The main object of the present invention is to provide a method permitting carbazole to be obtained in good yields in a simple way easy to carry out industrially from initial materials which are conveniently accessible. Another object is to synthesize carbazole of such purity that it can be used without large purification operations for further working up, for example to plastics.

We have found that cabazole is obtained in very good yields and with high purity by heating cyclohexanone azine to temperatures between 150° and 370° C., preferably between about 200° and 320° C., in the presence of at least one catalyst from the group consisting of boron fluoride, its etherates and alcoholates, a mineral acid, an acid salt of such an acid, a neutral salt (i.e., a salt containing no neutralizable hydrogen) of the said compounds with a weak base, such as ammonia, pyridine, methylamine, dimethylamine, trimethylamine, iron(III) hydroxide, zinc hydroxide and aluminum hydroxide, said catalyst if desired being applied to a carrier, and then converting the octahydrocarbazole thus obtained by cyclization, possibly without previous isolation and purification, into carbazole at temperatures between 200° and 500° C. or 620° C., preferably between 300° and 450° C., in the presence of a dehydrogenation catalyst.

In distinction from the known manner of operation, in which a current of dry hydrogen chloride is led continuously through the azine solution and thus the ammonia set free by the reaction is combined completely as ammonium chloride, the catalysts according to the present invention are used only in small, catalytic amounts, so that the ammonia split off by the reaction in the stage of cyclization escapes from the reaction mixture in the free form as a gas.

A specially advantageous embodiment of the process in which the two stages are comprehended in one, includes the use of catalysts which effect the conversion of the cyclohexanone azine into octahydrocarbazole which conversion comprises cyclization and splitting off of ammonia and the dehydrogenation of the octahydrocarbazole, for example by using catalysts for the conversion of the cyclohexanone azine into octahydrocarbazole and the dehydrogenation catalysts in admixture with each other.

The process according to this invention may be carried out continuously or discontinuously.

Cyclohexanone azine which is used as initial material for the first stage of the process is prepared in a manner known per se, for example from cyclohexanone and hydrazine hydrate.

Examples of mineral acids suitable as catalysts for the conversion of cyclohexanone azine to octahydrocarbazole are sulfuric acid, phosphoric acid, nitric acid and halogen hydroacids, especially hydrofluoric acid, hydrochloric acid and hydrobromic acid. Suitable acid salts are especially those of the alkali metals and alkaline earth metals and those of ammonium. In principle, any acid salt with any cation may be used. Suitable acid salts are for example potassium hydrogen sulfate, disodium hydrogen phosphate and sodium ammonium hydrogen phosphate. Of the neutral salts (i.e., salts containing no neutralizable hydrogen) of the said mineral acids and their acid salts with weak bases, it is of special advantage to use for example ammonium chloride, ammonium bromide, ammonium fluoride, ammonium nitrate, ammonium phosphate, ammonium perchlorate and ammonium sulfate.

Instead of neutral ammonium salts, there may be used however neutral salts of other weak bases with mineral acids, and suitable representatives of weak bases are for example aliphatic, cycloaliphatic, aromatic and heterocyclic amines, such as methylamine, dimethylamine, trimethylamine, dibutylamine, tributylamine, cyclohexylamine, aniline, dimethylaniline, piperidine and pyridine. Other weak bases are metal hydroxides, such as zinc hydroxide, iron hydroxide and aluminum hydroxide. Suitable neutral salts with inorganic weak bases, which may be used additionally to or instead of the catalysts already described, are for example zinc chloride, aluminum chloride, iron chloride, aluminum sulfate, aluminum bromide and zinc phosphate.

When carrying out the conversion of the azine to octahydrocarbazole discontinuously, the catalysts are preferably used in amounts of 0.25 to 1% by weight with reference to the weight of the azine. In the continuous process it is advantageous to use the catalysts on carriers, as for example aluminum oxide, silica gel, coke or bleaching earths.

The dehydrogenation of octahydrocarbazole to carbazole has not yet been described in the literature. It is preferably carried out in the gas phase in the presence of solid catalysts. Suitable catalysts are the known conventional dehydrogenation catalysts, as for example the metals of groups IB and VIII of the periodic system, as for example copper, iron, cobalt, nickel and platinum, oxides of metals of groups IIB, VB and VIB, as for example zinc oxide, cadmium oxide, vanadium pentoxide and chromium trioxide, sulfides of cobalt, nickel, molybdenum or tungsten or also mixtures of representatives of these classes, as for example mixtures of metallic and oxidic catalysts.

In the discontinuous conversion of cyclohexanone azine into octahydrocarbazole it is preferable to heat the mixture of azine and catalyst in a vessel with a stirring device to the desired temperature. The initiation of the reaction becomes evident by disengagement of ammonia. In general this evolution of ammonia, which as a rule proceeds very rapidly, starts to a considerable extent at temperatures up to 200° C. It is preferable however to raise the temperature toward the end of the splitting off, for example to about 350° C., advantageously 220° to 320° C.

The octaheydrocarbazole is recovered from the residue, advantageously by distillation under reduced pressure and preferably while excluding oxygen.

If the same conversion is carried out continuously, the carrier catalysts is conveniently arranged in a vertical tube, for example of glass, procelain or iron, and the vapor of the azine, if desired diluted with an inert gas, such as nitrogen or hydrogen, or vapors, as for example of benzene, and/or under reduced pressure, is led through the tube which is heated to 150° to 370° C. The purification of the crude product may take place as in the discontinuous process.

The dehydrogenation of the octahydrocarbazole is advantageously carried out in continuous operation. For this purpose the catalyst, in the same way as for carrying out the first step of the reaction continuously, may be charged into a vertical tube, which may also consist of glass, iron or porcelain. The catalyst, prior to the dehydrogenation, may if desired be reduced in the usual way, for example by leading hydrogen thereover at elevated temperature. For the dehydrogenation of the octahydrocarbazole, the fused product may be dripped onto the heated catalyst, possibly in a weak current of inert gas, as for example nitrogen. It is preferable however to bring the octahydrocarbazole in gaseous form into contact with the catalyst under reduced pressure, for example by leading vaporous octahydrocarbazole over the catalyst. The initial material may also be led diluted with an inert gas through a reaction tube charged with catalyst. The inert gas is then advantageously used in an amount of up to 300 ccs. per gram of octahydrocarbazole.

A recommended embodiment of the process comprises leading the vapor of octahydrocarbazole in the form in which it is obtained by reaction of the azine in the continuous process, without further isolation or purification over the dehydrogenation catalyst.

The process is also preferably carried out continuously when a catalyst is used which effects both the conversion of cyclohexanone azine into octahydrocarbazole and its dehydrogenation. For example a mixture of a catalyst suitable for the production of octahydrocarbazole with a dehydrogenation catalyst is arranged in a tube and fused cyclohexanone azine is dripped onto the catalyst mixture at temperatures between about 300° and 350° C.

The carbazole obtainable according to this invention is as a rule so pure that in many cases it can be directly further worked up.

The following examples will further illustrate this invention but the invention is not restricted to these examples.

EXAMPLE 1

2 grams of ammonium chloride are added to 384 grams of cyclohexanone azine and heated while stirring well in a reactor provided with a gas outlet pipe. At 200° to 210° C., strong evolution of ammonia gas sets in. The temperature of the reaction mixture is slowly raised to 250° C. After 2 to 3 hours, the splitting off of ammonia is ended. By distilling the reaction material away from oxygen, 284 grams of octahydrocarbazole of the boiling point 165° to 171° C. at 15 mm. Hg are obtained; it solidifies crystalline. The yield is 81% of the theory.

When carrying out the reaction, instead of with ammonium chloride, with any of the ammonium salts given in the table below, in the quantity and at the temperature stated, but under oherwise identical conditions, the yields of ocahydrocarbabzole are those set out in column 4 of the table. The figures given are for the pure distilled product.

Table

| Catalyst | Percentage by weight of catalyst referred to cyclohexanone azine | Reaction temperature in ° C. | Yield of octahydro- carbazole in percent by weight referred to the theory |
| --- | --- | --- | --- |
| (a) Ammonium nitrate | 1 | 250 | 68 |
| (b) Ammonium iodide | 1 | 240 | 55 |
| (c) Ammonium bromide | 1 | 240 | 67 |
| (d) Ammonium bifluoride | 0.25 | 300 | 86 |
| (e) Ammonium sulfate | 0.5 | 300 | 70 |
| (f) Ammonium phosphate | 0.5 | 320 | 75 |

For the dehydrogenation of the octahydrocarbazole, an iron tube 110 cm. long and 3.8 cm. in internal width is charged with a dehydrogenation catalyst composed of 8 parts of copper(II) oxide, 9 parts of chromium(III) oxide, 2 parts of barium oxide and 0.38 part of bleaching earth. The height of the catalyst layer in the tube is 90 to 100 cm. Its grain size is about 5 mm.

The tube thus prepared is heated to 430° C. by electrical heating while leading a weak current of hydrogen (3 liters per hour) through in order to reduce the catalyst and then while continuing leading through a current of hydrogen at the same temperature, 50 grams per hour of octahydrocarbazole preheated to 85° C. are dripped in from the top from a heatable burette. At the lower end of the tube, carbazole sublimes off into a flask provided with a gas outlet pipe. Crude carbazole of the melting point 204° C. is obtained in a yield of 93% of the theory.

EXAMPLE 2

1 gram of phosphoric acid (80% strength) is added to 384 grams of cyclohexanone azine and ammonia is split off by heating as described in Example 1, the temperature, after the initial strong formation of ammonia has subsided, being raised to 300° C. and the reaction completed. By distilling the reaction material there are obtained 259 grams of crystallized octahydrocarbazole of the boiling point 130° to 139° C. at 1.5 mm. Hg. This corresponds to a yield of 74% of the theory.

When operating in the same way as in the preceding paragraph with the phosphoric acid being replaced with an equal quantity of disodium phosphate ($Na_2HPO_4$) and heating slowly up to 370° C., the octahydrocarbazole, after distillation at a pressure of 1.5 mm. Hg, is obtained with a yield of 91% of the theory.

When using 1 gram of disodium ammonium phosphate instead of phosphoric acid under otherwise identical conditions, the yield of distilled octahydrocarbazole obtained is 89% of the theory.

The dehydrogenation is carried out in a way similar to that in Example 1. A catalyst is used which consists of 62.7% of vanadium pentoxide and 37.3% of zinc oxide, the grain size being 4 mm. It is heated to 400° C. and 60 grams per hour of fused octahydrocarbazole are allowed to drip in from a burette heated to 100° C. The crude carbazole of the melting point 231° to 239° C. is obtained in a yield of 91% of the theory.

EXAMPLE 3

384 grams of cyclohexanone azine and 3 grams of sulfuric acid of 98% by weight are fed into a vessel fitted with a gas outlet pipe and the vessel is slowly heated to 280° C. while stirring. After about 2 hours the splitting off of ammonia is complete. The reaction mixture is then distilled at a pressure of 2 mm. Hg away from oxygen. There are obtained 308 grams of octahydrocarbazole with a melting point of between 99° and 101° C.

A tube 110 cm. in length and 3.8 cm. in internal diameter is filled with a dehydrogenation catalyst consisting of 65% by weight of aluminum oxide, 30% by weight of tungsten sulfide and 5% by weight of nickel sulfide. The catalyst column has a height of about 100 cm. The tube is heated from the outside to a temperature of 450° C. and then a mixture of 30 grams per hour of vaporous octahydrocarbazole and 6 l./h. of nitrogen is introduced at its top. The vapors leaving at the lower end of the tube are cooled in a receiver, in which 27.5 grams of solid carbazole are precipitated hourly, whereas the non-condensed gases escape from the receiver. The carbazole is obtained in a yield of 96% of the theory and has a melting point of between 242° and 244° C.

By conducting the dehydrogenation under otherwise identical conditions at a temperature of 500° C. carbazole is obtained in a yield of 87% of the theory. This product has a melting point of between 241° and 243° C.

By conducting the dehydrogenation under otherwise identical conditions, but at a temperature of 620° C., carbazole is obtained in a yield of 87% of the theory. The product obtained then has a melting point of between 222° and 228° C.

EXAMPLE 4

2 grams of boron fluoride etherate are added to 384 grams of cyclohexanone azine and the mixture is heated in the apparatus described in Example 1 to 150° C. and the temperature slowly raised to 300° C. After the splitting off of ammonia has ended, the reaction mixture is distilled under a pressure of 1.5 mm. Hg. 266 grams of pure octahydrocarbazole are obtained. The yield corresponds to 76% of the theory.

By operating in the same manner as in the preceding paragraph, but replacing the boron fluoride etherate by the same amount of aluminum chloride, 273 grams of octahydrocarbazole are obtained. This yield corresponds to 78% of the theory.

The procedure of Example 1 is followed for the dehydrogenation. The catalyst consists of 57.5% of vanadium pentoxide and 42.5% of cadmium oxide, the grain size being 4 mm. The dehydrogenation temperature is 380° C. 50 to 60 grams per hour of octahydrocarbazole are dripped in from a heated burette. Crude carbazole of the melting point 227° to 233° C. is obtained in a yield of 93% of the theory.

EXAMPLE 5

A glass tube 100 cm. long and having an internal width of 4 cm. is charged to a height of 80 to 90 cm. with a catalyst which consists of 20% phosphoric acid on silica gel, the grain size being 6 to 7 mm. The tube is heated to 275° to 280° C. while leading a weak current (3 liters per hour) of nitrogen through and 100 to 150 grams of cyclohexanone azine per hour are allowed to drip in. At the lower end of the tube, the crystallized octahydrocarbazole is received by a glass flask provided with a gas outlet pipe. The yield is 98% of the theory. Pure octahydrocarbazole is obtained in a yield of 91% of the theory by distillation.

For dehydrogenation the octahydrocarbazole is led in vapor phase under a pressure of 20 mm. Hg over a catalyst containing 57.5% of vanadium pentoxide and 42.5% of cadmium oxide which is situated in a glass tube 100 cm. long and 4 cm. in internal width and which is heated to 400° C. The throughput is about 25 grams of octahydrocarbazole per hour. The carbazole is precipitated in a wide and cold glass tube connected by a ground joint with the upper end of the reaction tube. The yield of carbazole is 95% of the theory. The melting point of this product, which is already quite pure, is 236° to 243° C.

EXAMPLE 6

The apparatus used is a vertical tube charged with a catalyst which consists of aluminum oxide impregnated with 10% by weight of phosphoric acid. At its lower end the tube comprises a laterally attached gas outlet pipe and connected to this is a siphon in the form of a horizontal S. This siphon in turn is connected with a tube arranged at a lower level which contains a dehydrogenation catalyst consisting of 57% by weight of magnesium oxide and 43% by weight of vanadium pentoxide, the grain size being 4 mm. The temperature in the first tube is 275° to 280° C. and in the second 330° C.

44 grams of cyclohexanone azine per hour are dripped onto the catalyst in the first tube and, after stationary relationships have been set up, a crude carbazole of the melting point 234° to 238° C. is obtained at the lower end of the second tube in a yield of 94 to 95% of the theory.

EXAMPLE 7

An iron tube 110 cm. long and 3.8 cm. in internal width is charged with a mixed catalyst consisting of 50% of silica gel containing 20% of phosphoric acid, 28.75% of vanadium pentoxide and 21.25% of cadmium oxide.

The height of the layer of catalyst in the tube is 95 cm. The tube is heated to 320° C. while leading through a weak current (2 liters per hour) of nitrogen and from a heatable burette, while continuing the leading through of nitrogen, 35 grams of cyclohexanone azine are dripped in from above. At the lower end of the tube, carbazole sublimes into a flask fitted with a gas outlet pipe. Crude carbazole of the melting point 231° to 237° C. is obtained in a yield of 89% of the theory.

By working in the same way but without leading nitrogen into the reaction zone, 26.8 grams of crude carbazole are obtained per hour, corresponding to a yield of 88% of the theory.

What we claim is:

1. A process for the production of carbazole which comprises cyclizing cyclohexanone azine to octahydrocarbazole by heating cyclohexanone azine to a temperature between 150° and 370° C. in the presence of a catalyst selected from the group consisting of boron fluoride, its etherates and alcoholates, a mineral acid, an acid salt of said mineral acid, a neutral salt of the said acid compounds with a weak base and mixtures of said catalysts and dehydrogenating the octahydrocarbazole thus obtained to carbazole by contacting the octahydrocarbazole with at least one dehydrogenation catalyst selected from the group consisting of the metals of groups IB and VIII of the periodic system, oxides of metals of groups IIB, VB and VIB of the periodic system, and sulfides of cobalt, nickel, molybdenum and tungsten at a temperature between 200° and 620° C.

2. A process as claimed in claim 1 wherein the catalyst for the cyclization step is applied to a carrier selected from the group consisting of aluminum oxide, silica gel, coke and bleaching earths.

3. A process as claimed in claim 1 wherein the dehydrogenation of the octahydrocarbazole is carried out at a temperature between 300° and 450° C.

4. A continuous process for the production of carbazole which comprises introducing cyclohexanone azine in vapor form through a reaction zone heated to a temperature between 200° and 320° C. which is charged with a rigidly arranged catalyst applied to a carrier, said catalyst being selected from the group consisting of boron fluoride, its etherates and alcoholates, a mineral acid, an acid salt of said mineral acid, a neutral salt of one of the said said compounds with a weak base and mixtures of said catalysts, and introducing the vapors obtained directly through a further reaction zone which contains arranged therein a dehydrogenation catalyst and is heated to a temperature between 200° and 620° C.

5. A process as claimed in claim 4 wherein the catalyst for the first reaction zone is phosphoric acid on an inert carrier.

6. A process as claimed in claim 4 wherein an inert gas from the group consisting of nitrogen and hydrogen is led into the first reaction zone at the same time as the vaporous cyclohexanone azine.

7. A process for the production of carbazole which comprises heating cyclohexanone azine in a reaction zone at a temperature between 200° and 370° C. in the presence of a mixed catalyst which consist of a dehydrogenation catalyst and a catalyst selected from the group consisting of boron fluoride, its etherates and alcoholates, a mineral acid, an acid salt of said mineral acid, a neutral salt of one of the said acid compounds with a weak base and mixtures of said catalysts.

8. A process as claimed in claim 1 wherein the catalyst for the cyclization step is employed in an amount of about 0.25 to 1% by weight with reference to the amount of cyclohexanone azine.

9. A process as claimed in claim 7 wherein hydrogen is introduced into the reaction zone.

10. A process which comprises cyclizing cyclohexanone azine to octahydrocarbazole by heating cyclohexanone azine to a temperature between 150° C. and 370° C. in the presence of a catalyst selected from the group consisting of boron fluoride, its etherates and alcoholates, a mineral acid, an acid salt of said mineral acid, a neutral salt of the said acid compounds with a weak base and mixtures of said catalysts.

References Cited in the file of this patent

FOREIGN PATENTS 806,493  Great Britain _____ Dec. 23, 1958

OTHER REFERENCES

Brown et al.: Chemische Berichte, page 2156–2161, vol. 58 (1925).

Rogers: "Organic Synthesis," vol. 30, pages 90–92 (1950).

Campaigne et al.: J. Organic Chem., pages 478–87, (vol. 24), (1959).